United States Patent [19]

Morales-Garza

[11] Patent Number: 5,257,099

[45] Date of Patent: * Oct. 26, 1993

[54] CENTRAL DATA PROCESSING STATION FOR SATELLITE COMMUNICATION WITH LOCAL AREA AUDIENCE RESPONSE STATION

[75] Inventor: Fernando Morales-Garza, Monterrey, Mexico

[73] Assignee: TV Answer, Inc., Reston, Va.

[*] Notice: The portion of the term of this patent subsequent to Mar. 31, 2009 has been disclaimed.

[21] Appl. No.: 741,249

[22] Filed: Jul. 26, 1991

Related U.S. Application Data

[63] Continuation of Ser. No. 390,073, Aug. 7, 1989, abandoned.

[51] Int. Cl.⁵ .............................................. H04B 17/00
[52] U.S. Cl. .................................. 358/84; 455/2; 455/5.1; 455/13.1
[58] Field of Search ............... 358/84, 86; 435/2, 4.2, 435/5.1, 7, 12.1, 13.1, 15

[56] References Cited

U.S. PATENT DOCUMENTS

| | | | |
|---|---|---|---|
| 3,559,919 | 2/1971 | Sass | 244/1 |
| 4,285,064 | 8/1981 | Hodge | 455/13 |
| 4,397,019 | 8/1983 | Alvarez et al. | 455/13.1 |
| 4,451,700 | 5/1984 | Kempner et al. | 179/2 AS |
| 4,506,383 | 3/1985 | McGann | 455/17 |
| 4,591,906 | 5/1986 | Morales-Garza et al. | 358/84 |
| 4,630,108 | 12/1986 | Gomersall | 358/84 |
| 4,755,871 | 7/1988 | Morales-Garza et al. | 358/84 |
| 4,926,255 | 5/1990 | Von Korhorn | 358/84 |
| 5,101,267 | 3/1992 | Morales-Garza | 453/2 |

Primary Examiner—Jin F. Ng
Assistant Examiner—Edward Urban
Attorney, Agent, or Firm—Laurence R. Brown

[57] ABSTRACT

A network of local area audience response systems is coupled together at a central audience response processing station by a satellite communication system for real time audience response analysis, nationally or internationally. Each local area station and each response unit may be identified and verified by allocation of specific time slots for response preferably synchronously related to a TV picture program transmission carrying the audience questions to be answered. Wireless transmission of the question and answer signals in digital format of beeps of a single frequency keeps transmission channels narrow. The system may be operated in conjunction with TV broadcasting or independently.

4 Claims, 8 Drawing Sheets

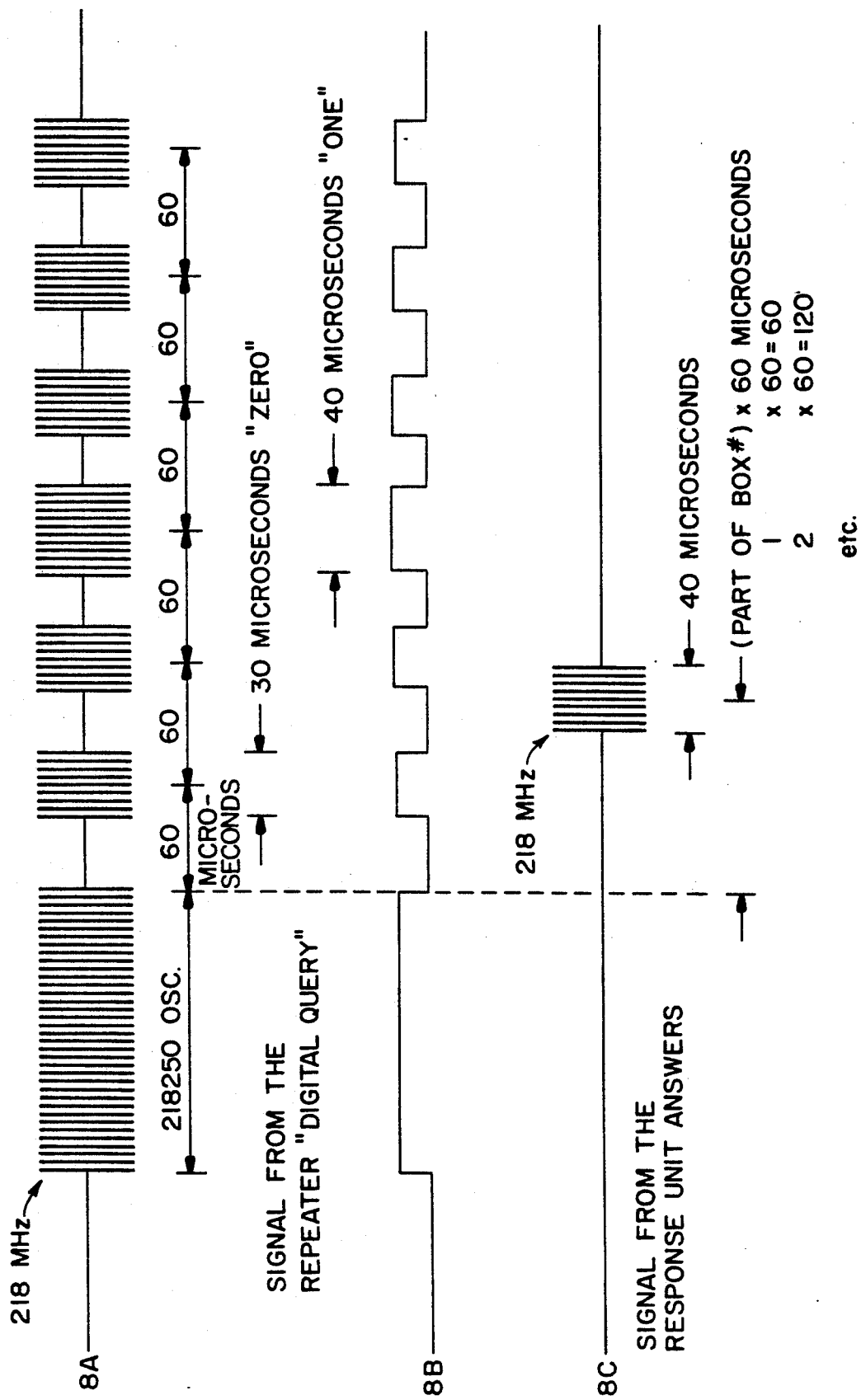

CENTRAL DATA PROCESSING STATION FOR SATELLITE COMMUNICATION WITH LOCAL AREA AUDIENCE RESPONSE STATION

This application is a continuation of application Ser. No. 07/390,073, filed Aug. 7, 1989, now abandoned.

TECHNICAL FIELD

This invention relates to two way audience polling communications between different audience response units such as TV receiver stations, and more particularly it relates to a communication system permitting questions to be sent to and answers to be received from individual response stations for processing at a central processing location.

BACKGROUND ART

Among prior art polling, voting and two-way communication systems is that of U.S. Pat. No. 4,591,906 to Fernando Morales-Garza, et al., May 27, 1986, which disclosure is incorporated herein in entirety to simplify the scope of the present disclosure while enabling those in the art to practice this invention, and to better clarify the nature and scope of the present invention. That system permits answers to be sent by single frequency beeps from TV receiver audience response stations to a central processing station, at a TV transmitter studio site for example. Specific response time slots identify the answering units and compensation is made for travel time of the radio signals.

Also known in the art are various local remote control units for operational control of TV receivers by infra red (IR) wireless systems. One such system is that of co-pending application Ser. No. 07/368,951 filed Jun. 13, 1989, now abandoned by Fernando Morales, et al. for Wireless Remote Control of Cursor Superimposed on TV Picture, which permits answers to be formulated by a TV viewer in a specified location on a TV screen and transmitted to a central analysis station.

A system for processing of audience response answers at a central station is described in U.S. Pat. No. 4,755,871 to Fernando Morales-Garza, et al., Jul. 5, 1988. This provides for inexpensive control of time slots at the response unit station by synchronization of timing with a TV program signal incorporating an audience question.

However, these prior art systems have not been able to process answers over a wide territorial range, such as for example nationally over the fifty states of the USA, or internationally for real time analysis.

It is therefore a general objective of this invention to provide a wireless communication system for audience polling, processing, analyzing and identifying responses, capable of feeding back verified responses for the information of the polled audiences, either together with a transmitted TV program or independently in an audience polling mode of operation.

A more specific objective of this invention is to use narrow band rf communication beeps capable of identifying responder TV stations, or the like, with time slot identification over wider territorial ranges than those of the aforesaid Patent 4,591,906, for example for nationwide or international polling with current polled results appropriately analyzed and verified.

Another specific objective of this invention is to provide by means of satellite communications a wireless processing system for real time audience polling over long distances, wherein specific TV receiver station, or like, response units can be identified, verified and analyzed for real time processing of responses from polled audiences.

Other objects, features and advantages of the present invention will be found throughout the following description, drawings and claims.

DISCLOSURE OF THE INVENTION

A set of local area audience analysis repeater stations, each communicate with a family of response units operating on the beep principle of U.S. Pat. No. 4,591,906. Questions and answers are communicated, processed and verified over local areas such as surrounding a TV transmitter site, with the capability of isolating and identifying each response unit in the audience. The repeater stations then communicate by intermediate satellite transmission channels to a central data center that receives the local signals to consolidate them into a nation-wide response result, for example. The data center also can process questions directed to the repeaters for local polling in individual time slots identifying each of the response units, which are typically TV receiver stations. Further verification, formatting, repeating and storage of answers, and real time feedback of response data to the polled audience takes place at the data center, typically a national or international processing station. Local response units are compatibly operated at the response unit site with cable systems, VCR systems and radio TV signals from local transmitters. Preferably these response units are controlled by way of wireless remote control units using infra red communication links. Frequency synthesizing equipment at the response unit sites keep the cost of response units low while accurately controlling the timing of ID time slots and system synchronization. Travel time of radio waves is accounted for in the system to provide accurate identity of the individual response units through assigned synchronous time slots.

The questions and answers are digitalized in local data processors for synchronous system transmission and for satellite communication purposes. They are sent on a single frequency narrow band radio transmission channel. Real time clock signals are incorporated into the system along with the questions to identify real-time responses for verification of responses that might include erroneous answers from VCR or re-broadcast signals at the response unit site.

Typically this system may be used for national or international audience polling, for weather condition polling, for price or market surveys and other financial data processing, or for educational purposes such as grading examinations from a network of colleges or other schools, as well as for billing and accounting purposes for receipt of special programs. It is unique in that data from a plurality of local areas is assembled by way of satellite transmission channels for producing a large polling area suitable for national or international audience surveys with real time processing making possible relay of current responses to the polled audience.

BRIEF DESCRIPTION OF THE DRAWINGS

Throughout the drawings similar reference characters are used to facilitate comparison between the respective figures and system elements. In the drawings:

FIG. 8 is a waveform chart outlining operational features of the repeater station equipment.

THE PREFERRED EMBODIMENTS

Figure 1:
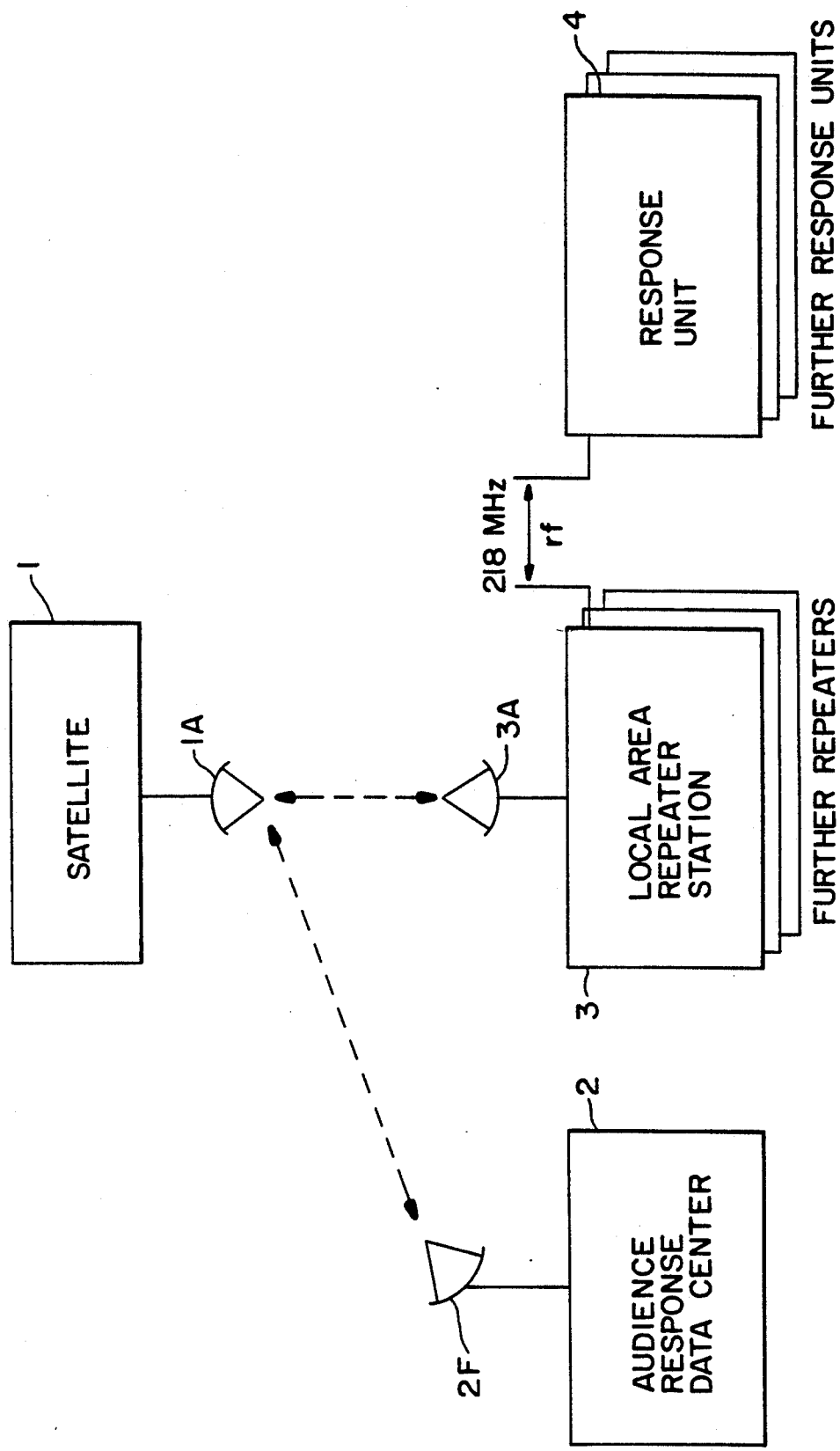
FIG. 1 is a block system diagram of the satellite communication audience polling system afforded by this invention.

In FIG. 1, the general system organization of the wide area satellite communication audience response system afforded by this invention is shown. The satellite station 1 through conventional communication channel links receives and repeats or retransmits data in either direction between the audience polling data center 2 and the local area repeater stations 3 by means of directional antennas 1A, 2F and 3A respectively. The audience polling data center thus is not restricted in location and may for example be a national or international audience polling center for communication with a set of local area audience polling repeater stations 3 located typically in cellular array locations throughout the designated area covered by the data center 2.

The audience polling questions and answers are centrally transmitted and received at the data center 2 for verification, processing, formatting, storage and if desired for retransmission in real time to the audience being polled. Thus questions are transmitted from the data center to the local area repeater stations via antenna 2F to the satellite antenna 1A and then to the local station antenna 3A. These questions may be formulated as part of a TV picture, or may be explicitly an audience polling system separate from TV programming.

The local repeater stations, for example at one site, then locally process the questions and answers on a narrow band single frequency channel, such as 218 MHz, in the form of beeps located in timing slots explicitly identifying the various response units 4 being processed in a local family audience, for billing, identification and verification purposes. Thus, the audience response is returned in real time through satellite station 1 to the central data center 2, with processing and verification at both the local area repeater stations 3 and the data center 2, where system wide audience response data may be analyzed and formatted. The directional parabolic antennas 2F and 3A from specific locations establish a system in which widely separated local area repeater stations can be coordinated and processed from a single central data center and control station.

Figure 2:
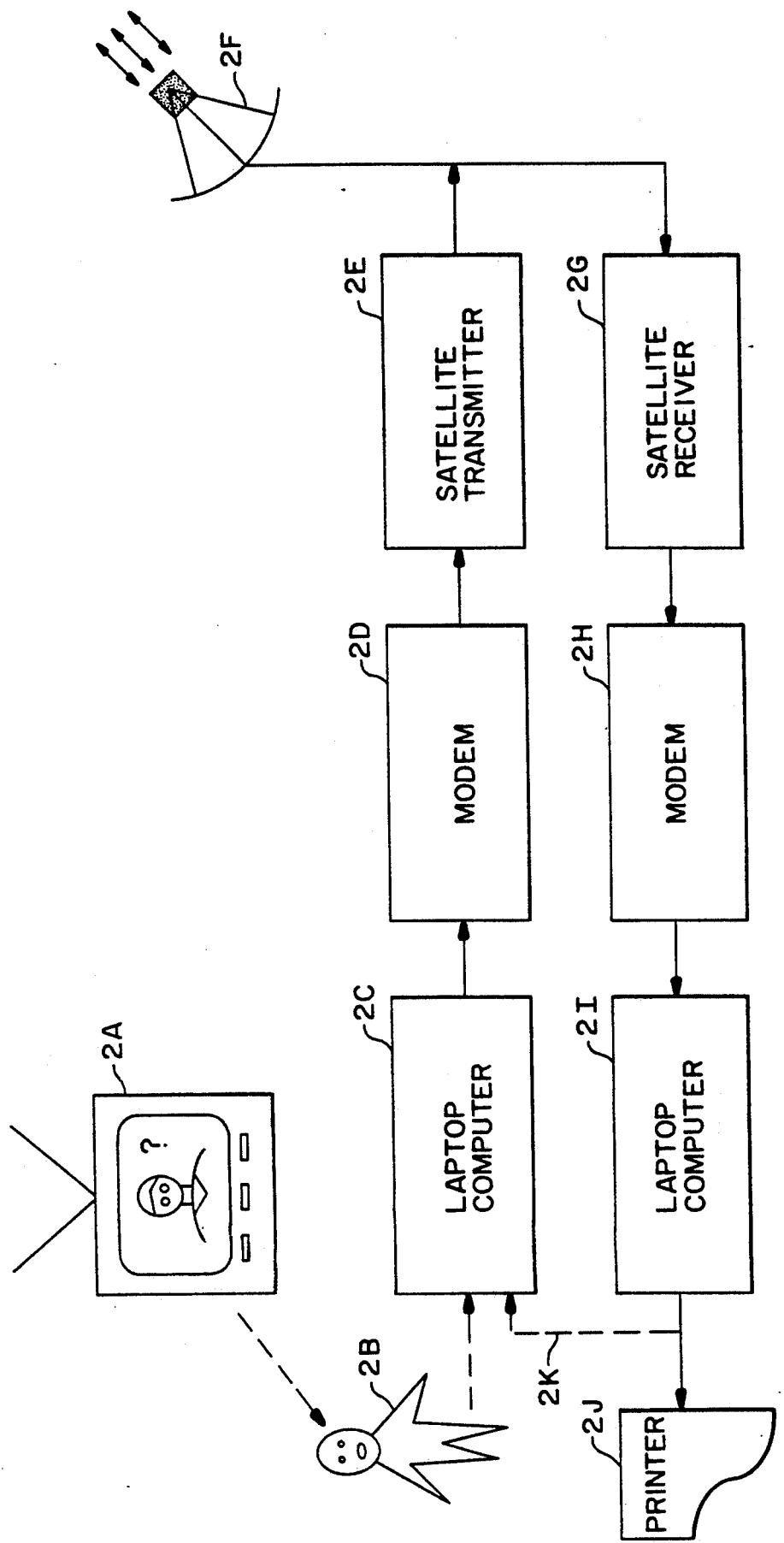
FIG. 2 is a block system diagram afforded by this invention of a data processing center for sending audience questions and receiving audience responses from a plurality of localized systems, such as city TV station audiences, to produce nationwide audience response data, for example.

At the data center 2, as shown in FIG. 2, a question (?) that may be associated with a TV picture on the TV receiver 2A screen is converted by operator 2B or corresponding automated equipment into a synchronously timed digital signal fashioned for processing in the audience response system, such as that in the U.S. Pat. No. 4,591,906. In a semi-automatic system as shown, the operator by way of a personal computer 2C for example programs the digital question data which via modem 2D, transitter 2E and directional antenna 2F is communicated on a transmission link through a satellite station 1, and to all the response units using a plurality of repeater stations 3. The response units answer the question using a specific time slot for each one, similar to the system described in the U.S. Pat. No. 4,491,906.

Similarly answers, verified at local repeater stations, are received from the satellite communication link at receiver 2G for processing through modem 2H and computer 21 for formatting and printout at printer 2J for example. The answers may also be incorporated in the TV picture signal going out for the benefit of real time monitoring by the polled audiences, as indicating by connection 2K.

Figure 3:
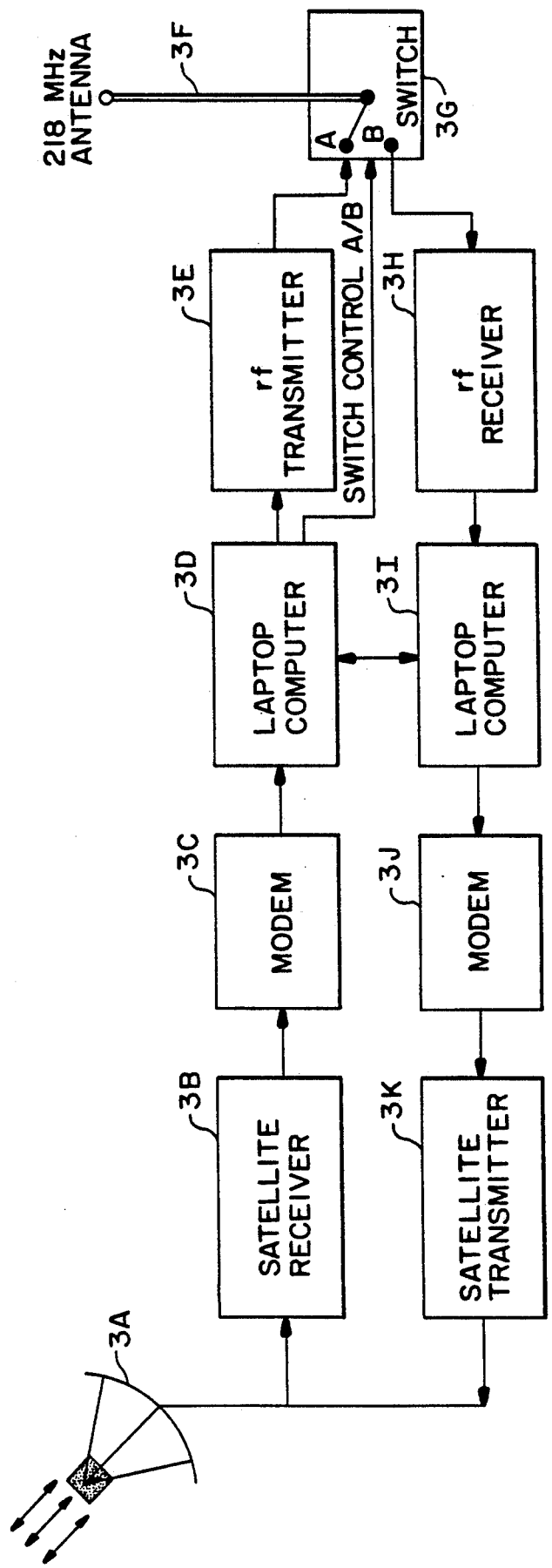
FIG. 3 is a block system diagram of local area repeater station equipment afforded by this invention to service local audience questions and responses.

Typical local area repeater transceiving equipment is shown in FIG. 3. Thus signals (questions) received from the satellite at antenna 3A are processed in receiver 3B, modem 3C, computer 3D and local rf transmitter 3E operating at 218 MHz for transmission from antenna 3F. In this transmitting mode the transmit-receive switch 3G is set to transmit position A. The reception default mode of switch 3G at B permits reception of answers at receiver 3H for verification and processing through computer 3I, modem 3J and transmitter 3K which communicates with the satellite data processing link. Summary or totalized audience response may be derived at computer 3I for example and verified. Satellite based discrimination equipment may distinguish between the transmissions from various local repeater station to prevent interference or to permit simultaneous transmissions on separate frequency bands for example. Preferably narrow band beep signals of the type disclosed previously are employed with all local repeater stations communicating on the same narrow frequency band through the satellite station. In this respect the local repeater stations all may be identified and slot time controlled in communicating to the central data station in the manner set forth in U.S. Pat. No. 4,591,906.

Figure 4:
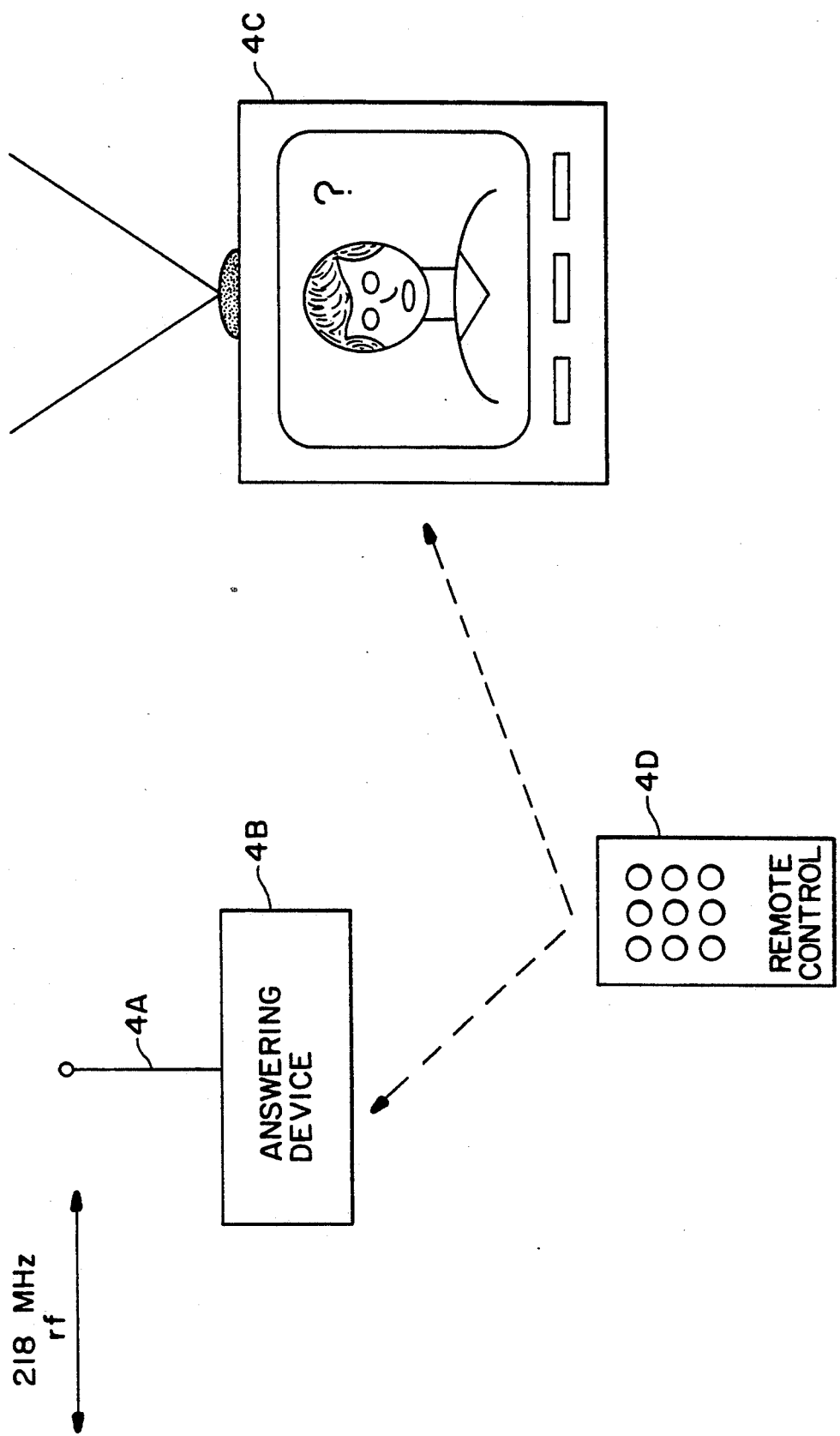
FIGS. 4 and 5 are block diagrams of several response unit embodiments afforded by this invention, typically TV receiver stations about a local TV transmitting station site provided with audience response processing equipment.

A simplified response unit is shown in FIG. 4, where a remote control unit 4D synchronously operated with the TV receiver 4C may provide answers through answering device 4B, preferably that of the aforementioned copending application, to be sent to the local repeater station on the 218 MHz beep frequency channel from the response unit transmitting antenna 4A.

Figure 5:
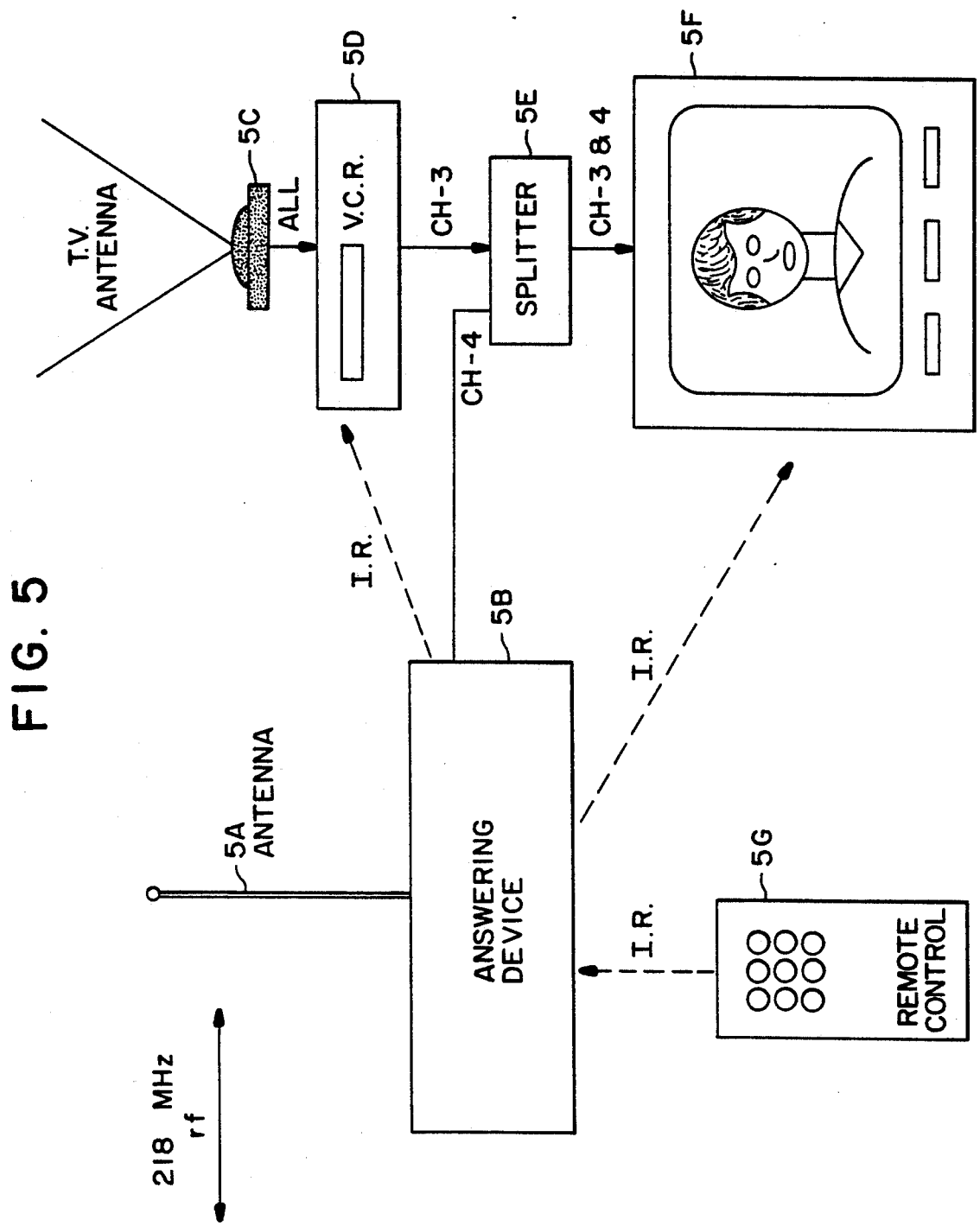

In the response unit of FIG. 5, the answering device 5B may operate independently from a TV program signal format, and may isolate its own TV channel using for example the frequency of channel 4, which can be mixed with other channels in conventional splitter 5E to provide a suitable presentation on the screen of TV set 5F. Thus the system is compatible with cable converter 5H, local rf broadcast signals received on antenna 5C and VCR 5D, all of which may operate conventionally on channel 3.

The responses are preferably made by IR wireless remote control unit 5G which controls answering device 5B for formulating response beeps for transmission at antenna 5A on the 218 MHz beep channel to the local repeater station.

Figure 6:
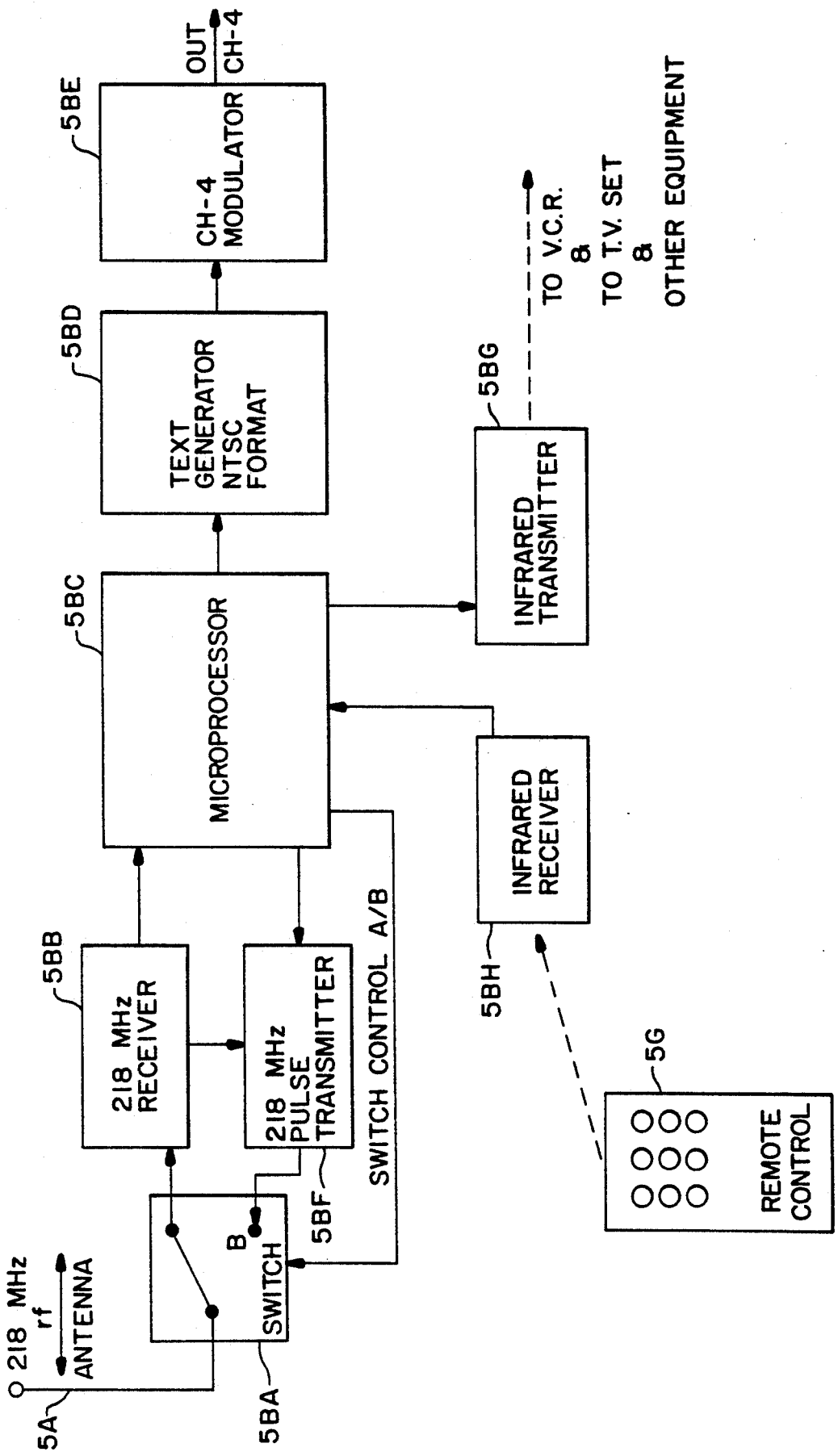
FIGS. 6 and 7 are block diagrams of some elements of the answering device of the audience response unit as afforded by this invention.

A preferred system for the response system is shown in FIG. 6. The antenna 5A receives information from the local repeater station and by way of transceiver switch 5BA selects receiver 5BB for processing incoming signals for use by microprocessor 5BC, which retains the signals in its memory. If the data comprises a real time question, the microprocessor 5BC is programmed to read the infrared receiver 5BH and relay through pulse transmitter 5BF and switch 5BA the response beeps to the repeater station.

For information related to TV scheduling sent to the receiver 5BB and retained in the storage of microprocessor 5BC, the text generator 5BD and channel 4 modulator 5BE presents the viewer appropriate information and sets the equipment to accept corresponding responses from the viewer unit 5G. The remote control device 5G also serves by way of infrared transmitter 5BG to control channel changes in the TV set, and to control the VCR and any other IR responsive local equipment at the response unit station.

Figure 7:
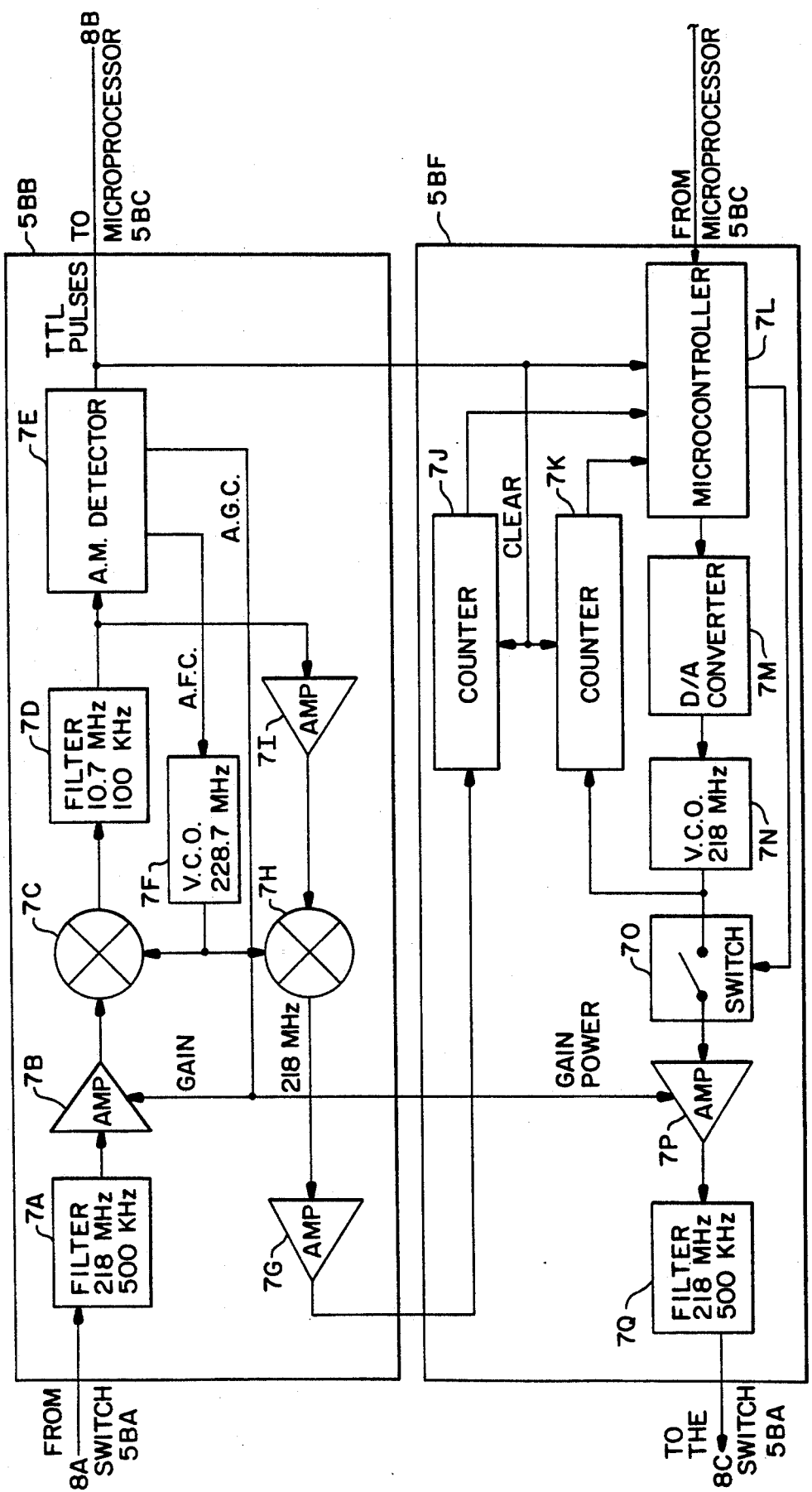

In FIG. 7 details of the transmitter 5BF and receiver 5BB are provided to both control the power for different strength signals received and to control the synchronization of the pulse time slots by synthesizing the received signal as a reference frequency, in similar manner disclosed in U.S. Pat. No. 4,755,871. As viewed with the waveforms of FIG. 8, the incoming rf signal 8A from the local repeater staion is processed in filter 7A to remove any interfering signals. Amplifier 7B by way of an AGC control circuit generates a standard level signal at mixer 7C. Using filter 7D and a m detector 7E, a signal 8B is generated for use in the microprocessor 5BC.

The a m detector 7E also generates AGC and AFC signals for gain and frequency control purposes to fine tune the voltage controlled oscillator (VCO) 7F, and to control the gain of amplifiers 7B and 7P. Thus, the locally controlled or synthesized frequency at 7F is mixed again with the signal 8A at mixer 7H and amplified at 7G for processing in counter 7J to count the number of oscillations. This counter 7J and also counter 7K are cleared every time the signal 8B returns to zero.

Counter 7K counts the oscillations from VCO 7N as an inut to microcontroller 7L, which by way of digital to analog converter 7M controls the transmission frequency of VCO 7N by comparing the counts on the two counters. Only when the counts are equal can the microcontroller transmit a radio frequency pulse 8C using switch 70 and power amplifier 7P as filtered through narrow band filter 7Q. Thus the output beep pulse to the local repeater station is carefully controlled in frequency and amplitude.

The signal 8A coming from the satellite preferably contains a coded real time clock signal inserted at the data center computer with the question for verification of live real time conditions by comparing the question and answer times in a clock portion of the microprocessor 5BC at the response unit or in the computer 31 of the local repeater station.

It is therefore evident that this invention advances the state of the art and provides a simple operative audience response communication system that can operate in real time nationally or internationally through satellite communication channels that gather signals from a set of local audience response processing and repeater stations for consolidation in a central data processing center. Therefore the features of novelty believed descriptive of the spirit and scope of the invention are defined with particularity in the following claims.

I claim:

1. In an audience response communication system comprising a satellite communication channel, a set of local area repeater stations and a set of local area audience response stations processed by the repeater stations, the combination comprising:

a central audience response processing station facility for communicating interactively over said satellite communication channel with individual ones of a plurality of widely dispersed local area audience response stations for processing interactively data derived from the individual audience response stations, having, data processing means responsive to interactive audience communications received from said network of said audience response stations from said plurality of local area repeater stations, and communication analysis means for processing received audience communications to extract and disburse interactive data contained in said audience responses, wherein said communication analysis means processes audience response "beep" signals superimposed on a carrier frequency in the order of 218 MHz.

2. In an audience response communication system comprising a satellite communication channel, a set of local area repeater stations and a set of local area audience response stations processed by the repeater stations, the combination comprising:

a central audience response processing station facility for communicating interactively over said satellite communication channel with individual ones of a plurality of widely dispersed local area audience response stations for processing interactively data derived from the individual audience response stations, having, data processing means responsive to interactive audience communications received from said network of said audience response stations from said plurality of local area repeater stations, communication analysis means for processing received audience communications to extract and disburse interactive data contained in said audience responses, video signal processing means, and transmission means for sending information inviting interactive audience response in video pictures to said audience response stations, wherein the information from said transmission means comprises at least one query located at a menu position on said video pictures, and said transmission means further comprises verification means for relating the query menu position and timing of audience responses relating to such query.

3. In an audience response communication system comprising a satellite communication channel, a set of local area repeater stations and a set of local area audience response stations processed by the repeater stations, the combination comprising:

a central audience response processing station facility for communicating interactively over said satellite communication channel with individual ones of a plurality of widely dispersed local area audience response stations for processing interactively data derived from the individual audience response stations, having, data processing means responsive to interactive audience communications received from said network of said audience response stations from said plurality of local area repeater stations, and communication analysis means for processing received audience communications to extract and disburse interactive data contained in said audience responses, wherein the communication analysis means further comprises digital reception means responsive to audience responses comprising timed digital data on a carrier frequency received by said local area repeater stations from said audience response stations over a narrow band communication channel at a frequency of substantially 218 MHz.

4. In an audience response communication system comprising a satellite communication channel, a set of local area repeater stations and a set of local area audience response stations processed by the repeater stations, the combination comprising:

a central audience response processing station facility for communicating interactively over said satellite communication channel with individual ones of a plurality of widely dispersed local area audience response stations for processing interactively data derived from the individual audience response stations having data processing means responsive to interactive audience communications received from said network of said audience response stations from said network of said plurality of local area repeater stations, communication analysis means for processing received audience communications to extract and disburse interactive data contained in said audience responses, further comprising means for communicating over said satellite communication channel with a network of local area audience response repeater stations for communicating in turn with the local audience response stations processed by the repeater stations, further comprising means for directing the data extracted via the repeater stations to designated ones of the local audience response stations in said set of local area audience response stations.

* * * * *